United States Patent
Hamilton, II et al.

(10) Patent No.: US 6,874,019 B2
(45) Date of Patent: Mar. 29, 2005

(54) PREDICTIVE CACHING AND HIGHLIGHTING OF WEB PAGES

(75) Inventors: Rick Allen Hamilton, II, Charlottesville, VA (US); John Steven Langford, Austin, TX (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 09/801,590

(22) Filed: Mar. 8, 2001

(65) Prior Publication Data

US 2002/0165925 A1 Nov. 7, 2002

(51) Int. Cl.[7] .............................. G06F 9/38; G06F 12/12
(52) U.S. Cl. ...................... 709/219; 709/232; 709/235; 711/133; 711/137
(58) Field of Search ................................. 709/200, 203, 709/217, 218, 219, 223, 232, 235; 711/118, 133, 137, 204, 213; 712/239

(56) References Cited

U.S. PATENT DOCUMENTS

| | | | |
|---|---|---|---|
| 5,848,410 A | 12/1998 | Walls et al. | 707/4 |
| 5,867,799 A | 2/1999 | Lang et al. | 707/1 |
| 6,009,410 A | 12/1999 | LeMole et al. | 705/14 |
| 6,009,429 A | 12/1999 | Greer et al. | 707/10 |
| 6,078,928 A | 6/2000 | Schnase et al. | 707/104 |
| 6,085,226 A * | 7/2000 | Horvitz | 709/203 |
| 6,088,731 A | 7/2000 | Kiraly et al. | 709/229 |
| 6,094,649 A | 7/2000 | Bowen et al. | 707/3 |
| 6,131,085 A | 10/2000 | Rossides | 705/1 |
| 6,151,630 A | 11/2000 | Williams | 709/229 |
| 6,182,133 B1 * | 1/2001 | Horvitz | 709/223 |
| 2001/0051927 A1 * | 12/2001 | London et al. | 705/51 |

FOREIGN PATENT DOCUMENTS

| | | | |
|---|---|---|---|
| JP | 410063679 A | | 3/1998 |
| JP | 410207901 A | | 8/1998 |
| JP | 2000215138 A | * | 8/2000 |
| JP | 2002259544 A | * | 9/2002 |
| WO | WO 99/08429 | * | 2/1999 |

OTHER PUBLICATIONS

IBM Technical Disclosure Bulletin, vol. 41, No. 01, Jan., 1998, IBM Corp., "Intelligent Searching of Databases", pp. 647 through 650.

* cited by examiner

Primary Examiner—B. James Peikari
(74) Attorney, Agent, or Firm—Robert H. Frantz; David A. Mims, Jr.

(57) ABSTRACT

A web browser predictively and automatically searches for web documents linked to a currently displayed web page which contain terms of interest to a web browser user. Linked documents containing terms of interest are automatically retrieved and stored while the user views the current document such that if the user selects the link to stored document, it will be displayed without waiting for it to download. To further assist the user in finding the documents containing the user's interest terms, links in the current page leading to the documents of interest are highlighted, and special fast links to those pages may be created and displayed for even greater noticeability and usability by the user.

13 Claims, 4 Drawing Sheets

PREDICTIVE CACHING AND HIGHLIGHTING OF WEB PAGES

CROSS-REFERENCE TO RELATED APPLICATIONS

This application is related to U.S. patent application Ser. No. 09/801,593, filed by Rick Allen Hamilton, II, et al., on Mar. 8, 2001.

FEDERALLY SPONSORED RESEARCH AND DEVELOPMENT STATEMENT

This invention was not developed in conjunction with any Federally sponsored contract.

MICROFICHE APPENDIX

Not applicable.

This application incorporates by reference the related U.S. patent application Ser. No. 09/801,593, filed by Rick Allen Hamilton, II, et al., on Mar. 8, 2001, in its entirety including drawings.

BACKGROUND OF THE INVENTION

1. Field of the Invention

This invention relates to the technology of web browsers and servers, and especially to the web browsing technologies which provide browsing capabilities prioritized and keyed to a user's personal interests.

2. Description of the Related Art

The Internet and the World Wide Web have become critical, integral parts of commercial operations, personal lives, and the education process. At the heart of Internet is web browser technology and Internet server technology.

An Internet server contains "content" such as documents, image or graphics files, forms, audio clips, etc., all of which is available to systems and browsers which have Internet connectivity.

Web browser or "client" computers may request documents from web addresses, to which appropriate web servers respond by transmitting one or more web documents, image or graphics files, forms, audio clips, etc. The most common protocol for transmission of web documents and contents from servers to browsers is Hyper Text Transmission Protocol ("HTTP").

FIG. 1 shows the fundamental client-server arrangement of Internet and intranet communications. A client browser computer (1) is provided with Internet access (2) to the World Wide Web (3) through common means such as a dial-up telephone line and modem, cable modem, or local area network ("LAN"). The web browser computer (1) is also provided with appropriate web browsing software, such as Netscape's Navigator or Microsoft's Explorer. A web server computer (5) is likewise provided with Internet access (4) to the World Wide Web (3) using similar means, or higher-bandwidth means such as T1 and T3 data lines, and a web server suite of software. Alternatively, client and servers may be interconnected via an Intranet (6), such as a corporate LAN. These arrangements are well known within the art.

The most common type of Internet content or document is Hyper Text Markup Language ("HTML") documents, but other formats are equally well known in the art, such as Adobe Portable Document Format ("PDF"). HTML, PDF and other web documents provide "hyperlinks" within the document, which allow a user to select another document or web site to view. Hyperlinks are specially marked text or areas in the document which when selected by the user commands the browser software to retrieve or fetch the indicated document.

Ordinarily, when the user selects a plain hyperlink the current page being displayed in the web browser's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page).

As the computing capacity of web browser computers increase and the communications bandwidth to the web browser computer increase dramatically, one challenge for organizations who provide Internet web sites and content is to deliver and filter such content in anticipation of these greater processing and throughput speeds.

This is particularly true in the realm of web-based applications, and in the development of better and more efficient ways to move user-pertinent information to the desktop or client.

However, today's web browsers are in general unintelligent software packages. As they currently exist, they require the user to manually search for any articles or documents of interest to him or her, and are often cumbersome in that they frequently require download of many documents before one of germane interest is found.

Search engines provide some level of "intelligence" to the browsing experience, wherein a user may point his unintelligent web browser to a search engine address, enter some keywords for a search, and then review each of the returned documents one at a time by selecting hyperlinks in the search results, or by re-pointing the web browser manually to provided web addresses. However, search engines do not really search the entire Internet, rather they search their own indices of Internet content which has been built by the search engine operator, usually through a process of reviewing manual submissions from other web site operators. Thus, it is common for a user to use several search engines while looking for information on a particular subject, because each search engine will return different results based on their own index content.

To partially address this problem, two other technologies have been developed and are well-known in the art. The first technology is known as a "metasearch engine" which is a search engine of search engines. A metasearch engine does not keep its own index, but rather submits a query to multiple search engines simultaneously, and returns to the user the highest ranked returns from each of the search engines. While this is more useful than manually serially visiting each of the queried search engines, the results are typically less satisfying than would be expected. Commonly, the top few returns on a list of ranked matches to the search keywords are not the most interesting, and so more often than not, a user visits the sites listed towards the middle or end of the return list. The metasearch engine may, though, return the top 5 of listings from 4 search engines, which may filter out the more likely interesting information.

The second attempt at solving this problem is known as web "crawler" engines. These servers periodically contact other servers to "re-index" previously indexed web site content, which tends to keep them more up-to-date and incorporates into their index any newly available information a web site. However, since thousands of new web sites are brought on-line each day, it is practically impossible for a crawler to visit new sites. So, even web crawlers may not provide full coverage of internet content.

Other attempts, including creating a "community of intelligent agents", use of server-based interactive sorting and filtering, a client-side "intelligent assistant" triggered by encountering special tags within a web document, and automatic "bookmark" functions, have been proposed in various U.S. patents. The related application provides a discussion of these technologies and methods. In general, all of these proposed technologies and methods require some amount of server-side and client-side cooperation, making it difficult to deploy these technologies on a wide scale.

Several years ago, client-side technology was introduced to download all web pages within one hyperlink of the web page currently loaded by the browser. By gathering all the directly linked documents from the currently visited page, whichever one the user next selected would be immediately available from a cache in local memory, thereby eliminating the wait for the newly selected page to be transmitted from the server to the web browser. By the time the user finished reading the next page (now the current page) and selected a subsequent document, the subsequent document had already been cached so that it, too, could be displayed without transmission delay. However, this process has shortcomings when visiting a "link-rich" web page. For example, a web page of a popular news site may have over 60 directly linked documents from the new service's home page. Thus, the communications network serving the web browser computer may pose a bottleneck or time-limiting factor for loading all 60 directly linked documents while the user reads the home page, and before the user selects a hyperlink on the home page. As such, only a few of these directly linked pages might be successfully downloaded in the time that it takes the reader to peruse the home page and to make a decision on the next document to view. Unfortunately, the pages that were successfully downloaded during the review of the home page may be of no interest to the user as the downloading function has no means for sorting or determining which pages may or may not be of interest.

The related application disclosed a system and method for configuring a web browser system to include a list of interest terms for a user. This method provided a list of the user's most sought-after keywords, the list being available to other software programs on the same client web browser computer.

Therefore, there is a need in the art for a web browsing method and system which predictively retrieves information from computer network servers and distributed databases, such as the World Wide Web, based upon a user's list of interest terms or keywords. Further, there is a need in the art for this new system and method to be compatible with widely-used web browser technologies, such as personal computers, web-enabled telephones, Internet appliances, personal digital assistants, and pocket PCs, with minimal or no server-side support or cooperating technology. Additionally, there is a need in the art for a system and method to highlight predictively cached information, or links to such information, on a user's display such that the user may easily and quickly view the predictively cached information.

BRIEF DESCRIPTION OF THE DRAWINGS

The following detailed description when taken in conjunction with the figures presented herein provide a complete disclosure of the invention.

The following detailed description when taken in conjunction with the figures presented herein provide a complete disclosure of the invention.

SUMMARY OF THE INVENTION

The present invention allows the web browser to predictively and automatically search for web documents linked to a currently displayed web page which contain terms of interest to the web browser user. Linked documents containing terms of interest are automatically retrieved and stored while the user views the current document such that if the user selects the link to stored document, it will be displayed without waiting for it to download. To further assist the user in finding the documents containing the user's interest terms, links in the current page leading to the documents of interest are highlighted, and special fast links to those pages may be created and displayed for even greater noticeability and usability by the user.

DETAILED DESCRIPTION OF THE INVENTION

For the purposes of this disclosure, it is assumed that all tasks associated with seeking out and loading web pages are conducted by a web browser application, such as Netscape's Navigator or Microsoft's Explorer. In practice, the invention described herein may be realized in web-browser associated software, which may or may not be part of the browser itself, such as a cooperating stand-alone software application or a web browser plug-in module. As such, it will be recognized by those skilled in the art that the construction of interest term lists, as described herein, can be accomplished by any piece of software, the results of which being made available to other browser-related functions and software.

Figure 1:
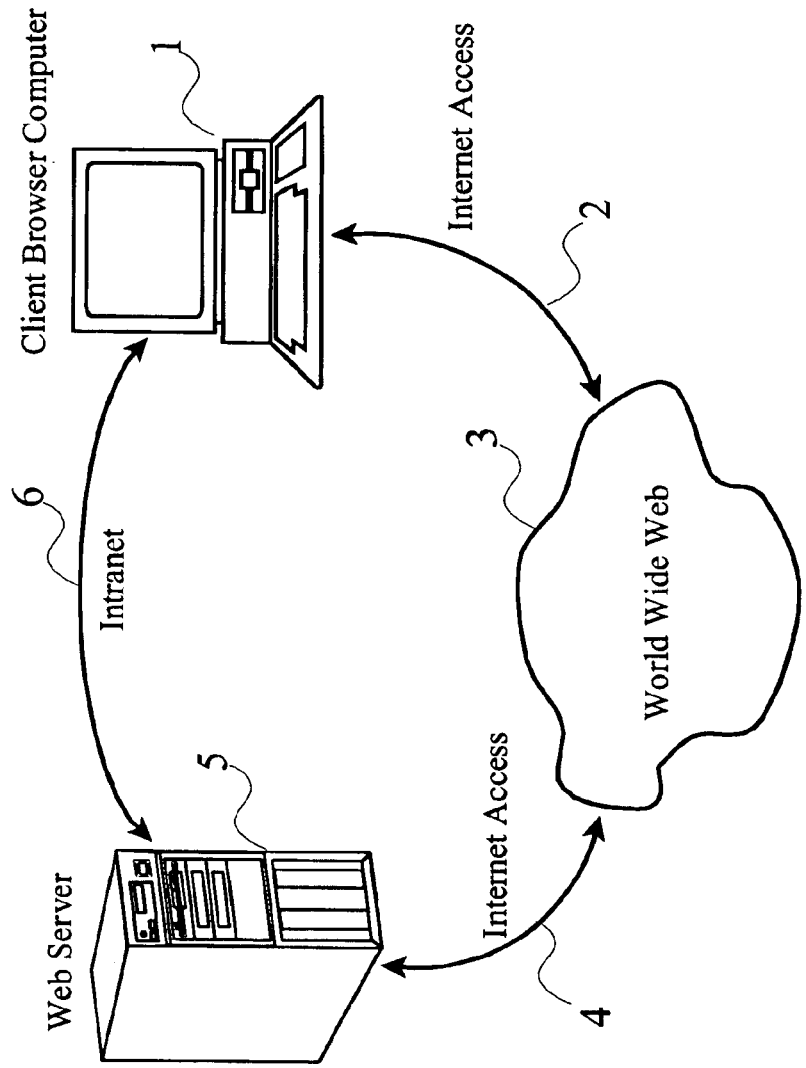
FIG. 1 shows the well-known arrangement between Internet clients or web browser systems, web server systems, and communications networks.
Figure 2:
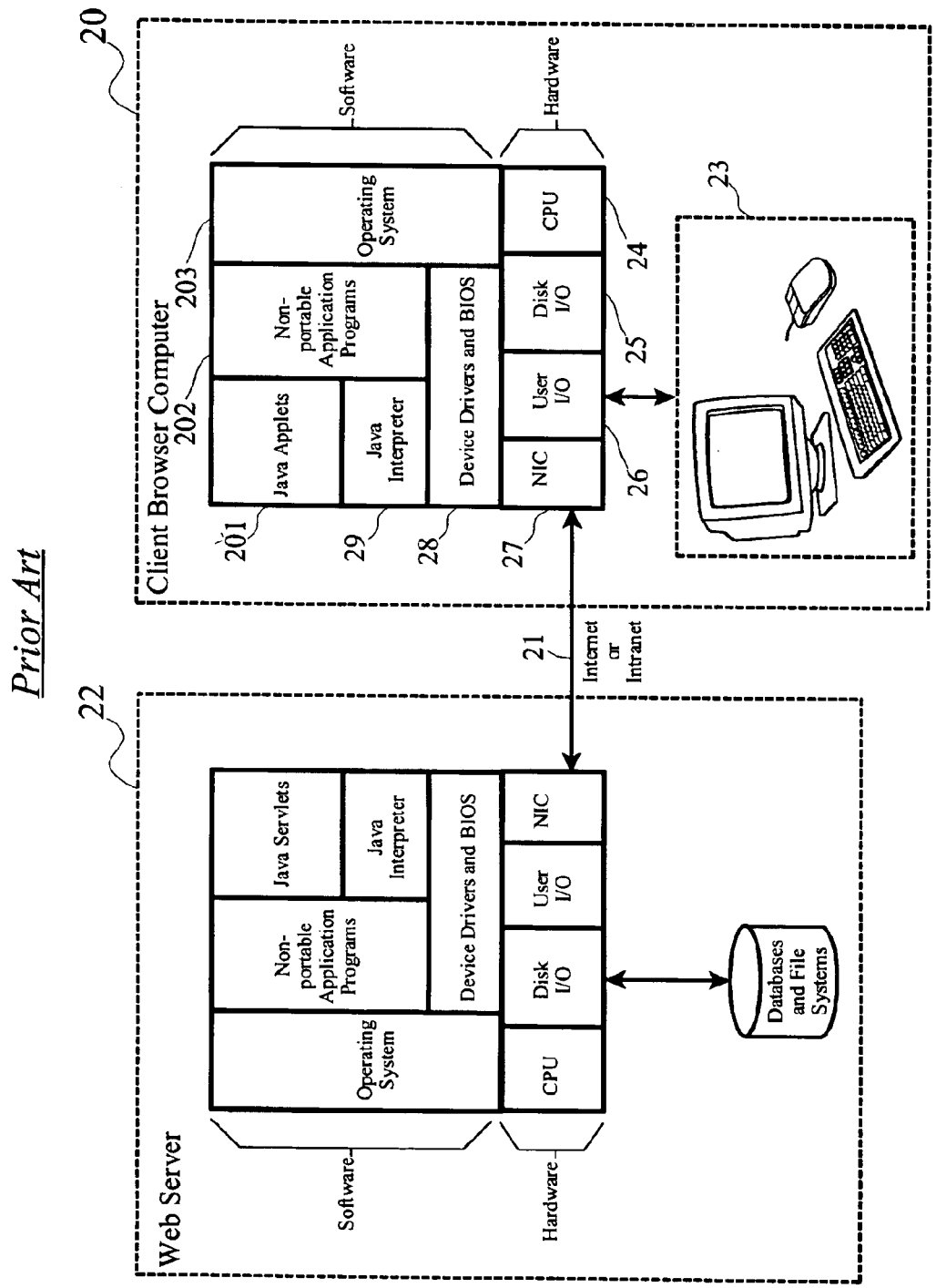
FIG. 2 illustrates the well-known architecture of web browser and web server systems.

FIG. 2 shows the general hardware and software architectures of typical web servers and web browser computer systems. A web browser computer (20) is communicatively interconnected via an Internet or intranet (21) to a web server computer (22). The web browser system comprises standard user interface devices (23) such as a computer display or monitor, keyboard, and mouse. The web browser computer (20) hardware platform comprises a central processor ("CPU") (24), disk drives (25), user interface device I/O (26), and network interface card ("NIC") (27). The NIC may be one of several varieties well known within the art, including a dial-up modem, local area network ("LAN") card, or cable modem interface. The software executed by the web browser computer (20) may include device drivers and a basic input/output system ("BIOS") (28), and operating system (203), application programs (202), and an applet interpreter (29) and applets (201). A web browser program, such as Netscape's Navigator, is an application program which can be executed by the CPU (24). This architecture and arrangement with a web server computer is well known within the art.

In the preferred embodiment, a standard web browser application software program is modified to include certain logical and functional enhancements. The functional enhancements utilize several existing capabilities of the existing web browser, such as the abilities to:

(1) interpret received web documents;

(2) cause all or part of a web document to be displayed in the current web browser display window;

(3) display user option icons, drop down lists or other mode control indicators in the web browser display window;

(4) receive user selections of user option icons, drop down lists and other mode control indicators in the web browser display window; and (5) create, store and access data items such as files, records, and cookies in system memory, especially persistent memory such as hard disk drives and non-volatile RAM or ROM.

As the foregoing general arrangement and architecture of a web browser system is well-known in the art, the remaining description of the invention is given relative to steps and functions preferably implemented as a browser plug-in for Netscape's Navigator running under Microsoft's Windows™ operating system on an IBM-compatible computer. However, it will be recognized by those skilled in the relevant arts that alternate operating systems, such as UNIX, Linux and Sun Microsystem's Solaris, alternate computer hardware such as IBM's RS6000, Apple's iMac ™ personal digital assistant's and web-enabled telephones, as well as alternate software embodiments such as Java scripts or compiled programs may be adopted without departing from the spirit and scope of the present invention. In still other embodiments, web server servelets or programs may maintain the interest term list, making that list available to client-side programs and plug-ins upon request.

The invention improves on this original concept and functionality of web browsers in general. The present invention is preferably implemented in conjunction with the invention disclosed in the related application. The related invention permits the web browser to determine what keywords may be of interest to the web browser user. These interest terms are preferably stored in system persistent memory and are accessible as a flat text file by the present invention. Alternative embodiments of the interest term list, such as records in a database, were disclosed, all of which are readily accessible by other programs including the browser plug-in of the present invention.

Other methods or systems for creating the interest term list may be utilized in conjunction with the present invention, however the system and method of the related application provide several useful methodologies for generating the interest term list.

Table 1 shows an example of the interest term list embodiment after it is generated by the related invention. This example user's interest term list is provided in a comma-separated variable ("CSV") format wherein a colon ":" is defined to indicate a general category for which sub-categories are specified. If no colon follows a category or term, it is assumed that all sub-categories and terms available under that category are of interest.

TABLE 1

Example User's Interest Term List File

Politics <CR>
Sports: Baseball, Professional Basketball, Motor Sports <CR>
<EOF>

The user's interest term list is preferably directly user-editable so that if a user wishes to delete an interest term which may have been added earlier, he or she may do so easily with a common text file editor or database program. Similarly, if a user wishes to add an interest term at a later time, he or she should have the option of re-invoking the menus or directly editing a file to do so.

The present invention provides two user-selectable processes for predictively retrieving and caching information from web servers based upon a user's interest term list. In the first process, only "interest-term" specific hyperlinked information will be preemptively cached, providing an improvement over the well-known process of caching all "1 hop" web pages by web browsers. The second process disclosed herein highlights any hyperlinks which lead to information containing the user's interest terms in order to bring these links to the user's attention, such as by highlighting text or images on the web browser display, panning within a separate web browser window, or within a special frame in the primary web browser window.

For better clarity and specificity in the following detailed disclosure, the following terminology is used:

"interest terms" are those words or phrases, in a self-explanatory fashion, in which the end-user has an interest;

"N hop scan" signifies the link space within which the web browser will attempt to predictively load and examine web pages and associated text;

"interest links" are those hyperlinks accessible within an "N hop scan" which contain interest terms;

"fast link" is a highly visible link, removed from the clutter of a display of a normal web page which contains a direct link to a discovered page containing interest terms;

"deep-linking" is a commonly accepted term which refers to pulling web content from deep within an organization's website, or otherwise retrieving data through a series of URLs, without necessarily loading or visiting the intermediate web pages;

"contemplation time" is defined as the time spent by the user on a given web page, which is the time available for the web browser system to determine and highlight any interest links branching off of the currently loaded web page; and "TB" is the size of text, such as in bytes, downloaded as the browser scans a page for interest terms.

Figure 3:
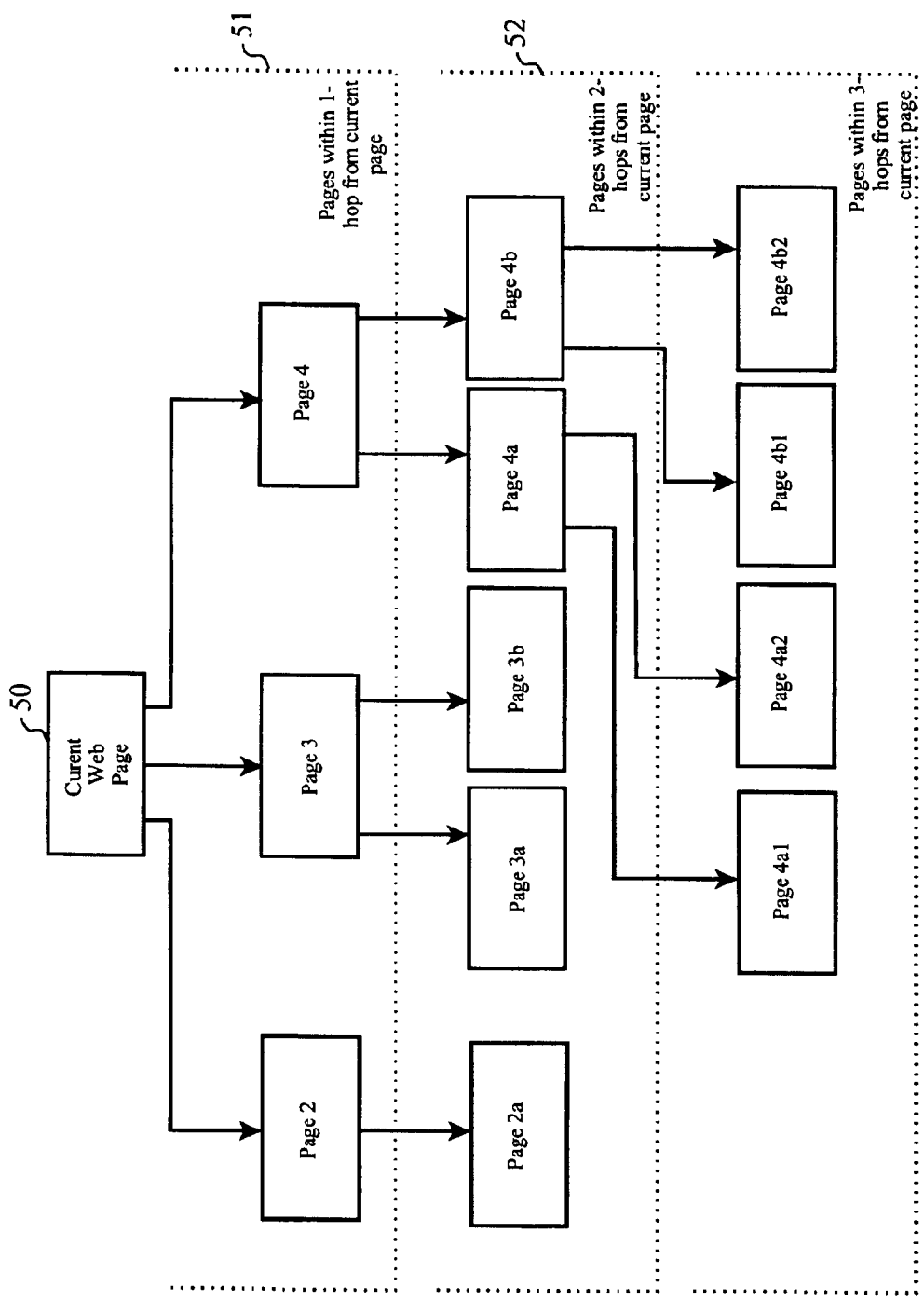
FIG. 3 shows a typical tree-like structure of hyperlinked documents on a web site.

An N-hop scan, as discussed above, is a predictive scan or retrieval of documents which are reached within "N" hyperlinks from the starting point. A typical tree-like structure or representation of a web site content is shown in FIG. 3. Each page has hyperlinked pages from it, the hyperlinks being shown as the arrow lines from a page to another page or pages. The variable "N" describes the depth or space within which information is found relative to a starting point.

For example, a 1-hop scan (e.g. N=1) (51) retrieves all hyperlinked documents accessible via a single "click" or hyperlink from the current web page (50), namely pages 2, 3, and 4 in this example, and the web page contents of these documents are scanned for occurrences of the user's interest terms.

Likewise, a 2-hop scan (N=2) (52) will retrieve all documents hyperlinked and accessible via two "clicks" from the current web page, such as all the pages of the 1-hop scan plus pages 2a, 3a, 3b, 4a, and 4b in this example.

From the tree-like expansion of this diagram, it can be seen that the amount of data to be considered may grow exponentially relative to the value of N, and higher order scans will be more practical with further increases in computer network communications bandwidth and web browser computer processor speed.

Figure 4:
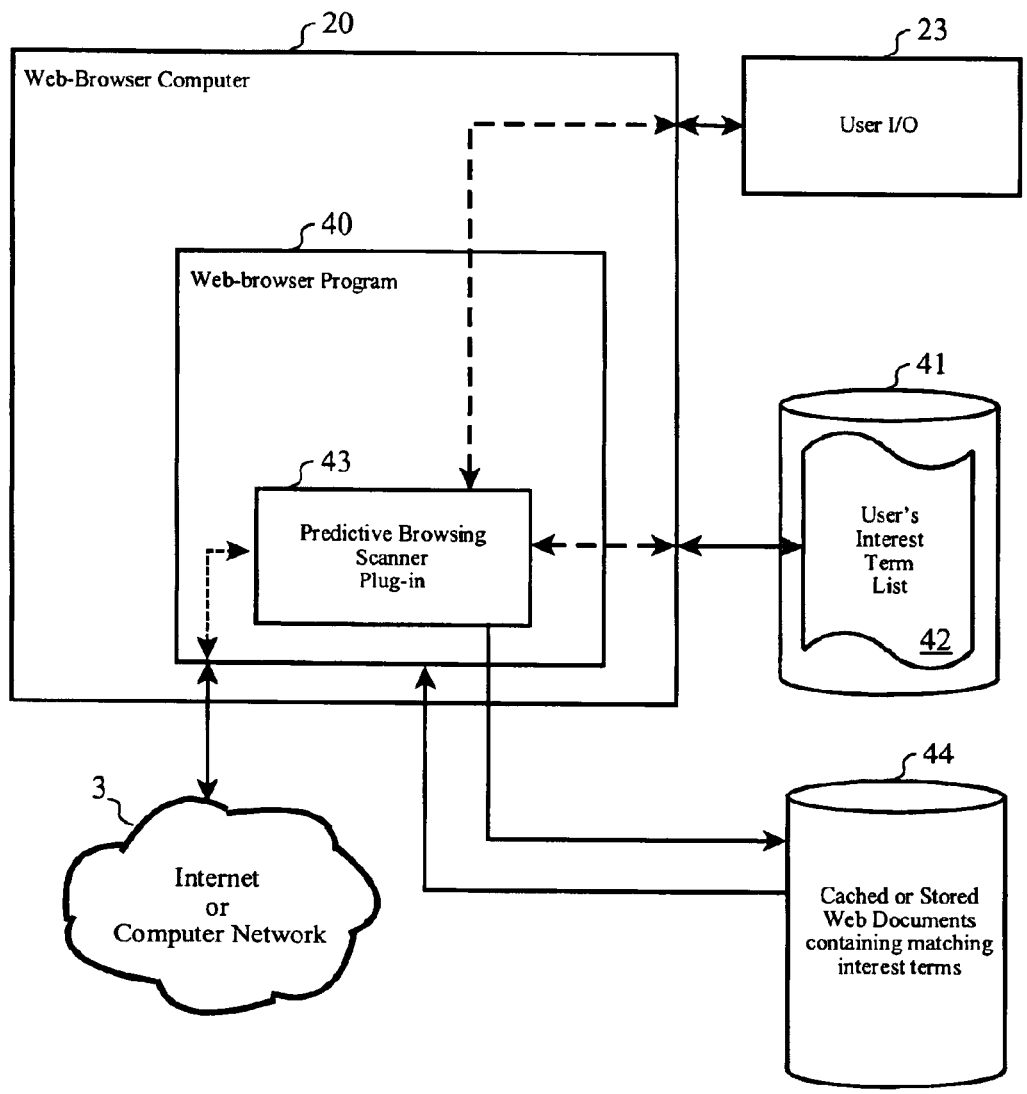
FIG. 4 discloses the arrangement of the preferred embodiment of the invention.

Turning to FIG. 4, the realized structure of the preferred embodiment is shown. The interest term predictive scanner plug-in (43) runs within the environment of the web browser program (40) on a web browser computer (20), using the web browser computer's user I/O (23) facilities to display to the user highlighted links, fast links, and spawned display frames, as discussed in the following description. A user's interest term list (42) in a simple text file or database records, is accessed from it's storage medium (41), such as on a hard drive or in persistent memory of the web browser system (20). Alternatively, the user's interest term list (42) may be accessed from a web or network server where it is accessible by the web browser system (20).

The interest term predictive scanner plug-in (43) also uses the communications capabilities of the web-browser computer (20), such as its network interface card and communications protocol (TCP/IP), and the web browser program's (40) communications and display capabilities, such as HTTP, to selectively retrieve portions of web documents from the Internet (3) or other computer network.

The present invention operates during the contemplation time for a current web page to predictively retrieve hyperlinked documents within a N-hop scan space based upon the user's interest terms. It assumes that interest keywords can be stored, through the use of other art such as that disclosed in the related application, within the web browser system and/or associated software. Subsequently, knowledge of such interest terms is exploited by "read-ahead" predictive downloads.

The predictive caching process commences as soon as a web browser loads any web page following a user's selection of that page or other action to select a page, such as selection of a bookmark, navigation button, etc. The currently loaded and viewed web page is set to the starting point, or "current page", of the N-hop scan.

The invention then parses the current page source, such as the HTML of the current page, and begins downloading of all web pages directly linked to the current page, referred to as the 1-hop pages. Downloading of each page is interrupted after successful receipt of a predetermined amount of data, such as the number of bytes or kilobytes defined by TB.

Next, the downloaded portion of each page is scanned to determine if they contain any occurrences of any of the user's interest terms. If, after the predetermined number of bytes are downloaded, any of the user's interest terms are not found within either the plain text or metawords of the web page, the download is aborted. By aborting the full page download, the browser preserves both network bandwidth and time; these preserved resources are then used instead to scan at the next possible interesting page. If interest terms are found, the download is resumed and completed and the entire linked page is stored in cache.

While the user continues contemplating the currently loaded page, the browser looks at the next 1-hop page, and the next, until all 1-hop pages are scanned and cached as necessary.

If all 1-hop pages are scanned before the user finishes reviewing the current page, the hop level is incremented, and subsequent levels of depth of the web site content are scanned by downloading portions of each 2-hop, then 3-hop, etc., page, scanning for keywords, and caching the entire page if interest terms are found, as previously described.

The predictive scanning process may be described by the pseudocode of TABLE 2.

TABLE 2

Pseudocode for Predictive Scanning Process

```
UNTIL (user selects a link in current_page):
  FOR hop = 1 to N:
    scan_page = current_page
    catalog all referenced_links from current_page
    randomly order from first to last all referenced_links
    FROM first TO last referenced_link:
      download document portion at referenced_link
      scan portion for occurrences of interest terms
      IF occurrences found, THEN:
        complete download of document
        store document in cache
        highlight referenced_link
        create "fast link" to cached document (optional)
      ELSE discard portion of document
    NEXT referenced_link /* scan next portion of linked document in
                           this hop */
NEXT hop /* scan next set of documents one hop further from current
           pg */
```

As one-hop pages are discovered to contain the user's interest terms, they are then brought to the user's attention by any one of several methods. First, the hyperlink or links leading to the page containing the interest terms may be highlighted in the display of the current page, such as by changing the color, font or size of the display of the hyperlink. In an enhanced embodiment of the invention, a "fast link" may be created within a separate frame on the current window, either along one side, the top, or the bottom, of the current page or within a separate web browser window.

This provides the user a modified web browser display which highlights links which are more likely to lead to documents of interest to the user, according to his or her interest term list, and allows the user to more efficiently browse the current web site.

It should be noted that if fast link display is used, multi-hop interest links can be one-hopped, that is, the next step in the path to the interest link is shown, after which the next step in the path is shown, etc., or they can be "deep linked." In this latter case, the first link shown in the frame, window, etc., deep links to the interest item, even if it is accessible only through multiple hops, and the display of that top level first link may be highlighted. In a further refined embodiment of the invention, one highlighting method may be used to highlight one-hop links to interesting documents, while another highlighting method can be used to highlight multi-hop links to interesting documents. For example, one-hop interesting links could be set to blink in red text, while multi-hop links to interesting documents may be shown or highlighted in steady red text. HTML code to set colors, font, and blink attributes are well known, so the browser plug-in of the preferred embodiment must simply changes these attributes for the web browser display of that portion of the current web page.

Also note that the invention undertakes a "breadth-first search," rather than drilling down through "N hops" from one given starting point. Alternatively, a "depth-first search" could also be undertaken, although it is deemed less practical and efficient from the inventor's viewpoint as links not contained in the initially-downloaded document portions may be missed or skipped. Either search technique may be used with general applicability of the concepts disclosed here.

It should also be recognized that a common list of interest page "fast-links" can be maintained in the separate window or frame, if desired, even if a user progresses down one particular path. Consider, for instance, a user at web page "A" who is given a list of interest links "B" and "C". It may be readily observed that the user would progress to interest link "B" while still maintaining a fast-link to web page "C" in the separate frame or window. After reading "B," and presuming that interest links arrived while doing so, maintenance of "C" in a fast-link window would permit him or her to immediately jump back to the other path, not previously taken.

By incorporating the invention into a web browsing system or product, a more intelligent means of browsing the vast total content of the World Wide Web and its constituent web sites based upon the user's interests is enabled.

While specific examples and details related to a preferred embodiment have been set forth herein, it will be recognized by those skilled in the art that various alternatives and engineering choices may be made without departing from the spirit and scope of the present invention, including but not limited to realization of the method as an application program, portable language script, server-side program or script, or browser enhancement; use of a different web browser computer such as a web-enabled telephone, Internet appliance, or personal digital assistant; and use of an alternative operating system such as Windows™ CE. Therefore, the scope of the present invention should only be determined by the following claims.

What is claimed is:

1. A method for predictively browsing for web documents of potential interest a user of a web browser system, said web browser system having a user display, a user input device, and a persistent storage device, said web documents containing words and being accessible through a linked address from said web browser system, said method comprises the steps of:
    receiving a portion of a web document from a linked address within an N-hop link space relative to a present address of a first web document, wherein N is greater than 1;
    determining if said portion of a web document contains one or more predetermined words of interest to said user; and
    responsive to determining one or more words of interest are present in said document portion, receiving and storing an entirety of said web document.

2. The method as set forth in claim 1 further comprising repeating said steps of receiving a portion of a web document, determining if said portion contains interest words, and receiving and storing an entirety of a web document for a plurality of web documents accessible within said N-hop link space.

3. The method as set forth in claim 1 further comprising the step of highlighting of a link to a web document on said web browser display by modifying the appearance of the link from its default appearance as set by the present web document.

4. The method as set forth in claim 1 further comprising creating a fast link said stored web document on said web browser display, wherein said fast link is a highly visible link, removed from the clutter of the present web document which contains a direct link to a discovered page containing said interest term.

5. A computer readable medium having program code for predictively browsing for web documents of potential interest to a user of a web browser system, said web browser system having a processor capable of executing program code, user display, a user input device, and a persistent storage device, said web documents containing words and being accessible through a linked address from said web browser system, said program code when executed by said processor causing the web browser system to perform the steps of:
    receive a portion of a web document from a linked address within an N-hop link space relative to a present address of a first web document, wherein N is greater than 1;
    determine if said portion of a web document contains one or more predetermined words of interest to said user; and
    receive and store an entirety of said web document responsive to determining one
    or more words of interest are present in said document portion.

6. The computer readable medium as set forth in claim 5 further comprising program code for repeating said steps of receiving a portion of a web document, determining if said portion contains interest words, and receiving and storing an entirety of a web document for a plurality of web documents accessible within said N-hop link space.

7. The computer readable medium as set forth in claim 5 further comprising code for performing the step of highlighting of a link to a web document on said web browser display by modifying the appearance of the link from its default appearance as set by the present web document.

8. The computer readable medium as set forth in claim 5 further comprising program code for creating a fast link to said stored web document on said web browser display, wherein said fast link is a highly visible link, removed from the clutter of the present web document which contains a direct link to a discovered page containing said interest term.

9. An enhanced web browser system capable of predictively browsing for web documents of potential interest to a user of a web browser system, said web documents containing words and being accessible through a linked address from said web brows system, said system comprising:
    a processor for executing program code;
    a user display for presenting information to a user;
    a user input device for receiving user input;
    a persistent storage device for storing data and information, including a user interest term list stored therein, said interest term list containing words of interest to the user; and
    a predictive interest-based browser program executable by said processor, said browser program adapted to receive a portion of a web document from a linked address within an N-hop link space relative to a present address of a fist web document, wherein N is greater than 1, to determine if said portion of a web document contains one or more interest term words, and to receive and store an entirety of said web document responsive to determining one or more interest term words are found in said document portion.

10. The system as set forth in claim 9 wherein said predictive interest-based browser program comprises a standard web browser program with a browser plug-in, said browser plug-in being adapted to receive a portion of a web document from a linked address within said N-hop link space, to determine if said portion of a web document contains one or more interest term words, and to receive and store an entirety of said web document responsive to determining one or more interest term words are found in said document portion.

11. The system as set forth in claim 9 wherein said web documents comprise HTML documents.

12. The system as set forth in claim 9 further comprising a link highlighter for modifying the appearance of said link to said stored web document from its default appearance as set by the present web document.

13. The system as set forth in claim 9 further comprising a fast link creator, wherein said fast link is a highly visible link, removed from the clutter of the present web document which contains a direct link to a discovered page containing said interest term.

* * * * *